No. 874,331. PATENTED DEC. 17, 1907.
A. GULDEMANN.
LOOM SHUTTLE.
APPLICATION FILED JUNE 11, 1906.
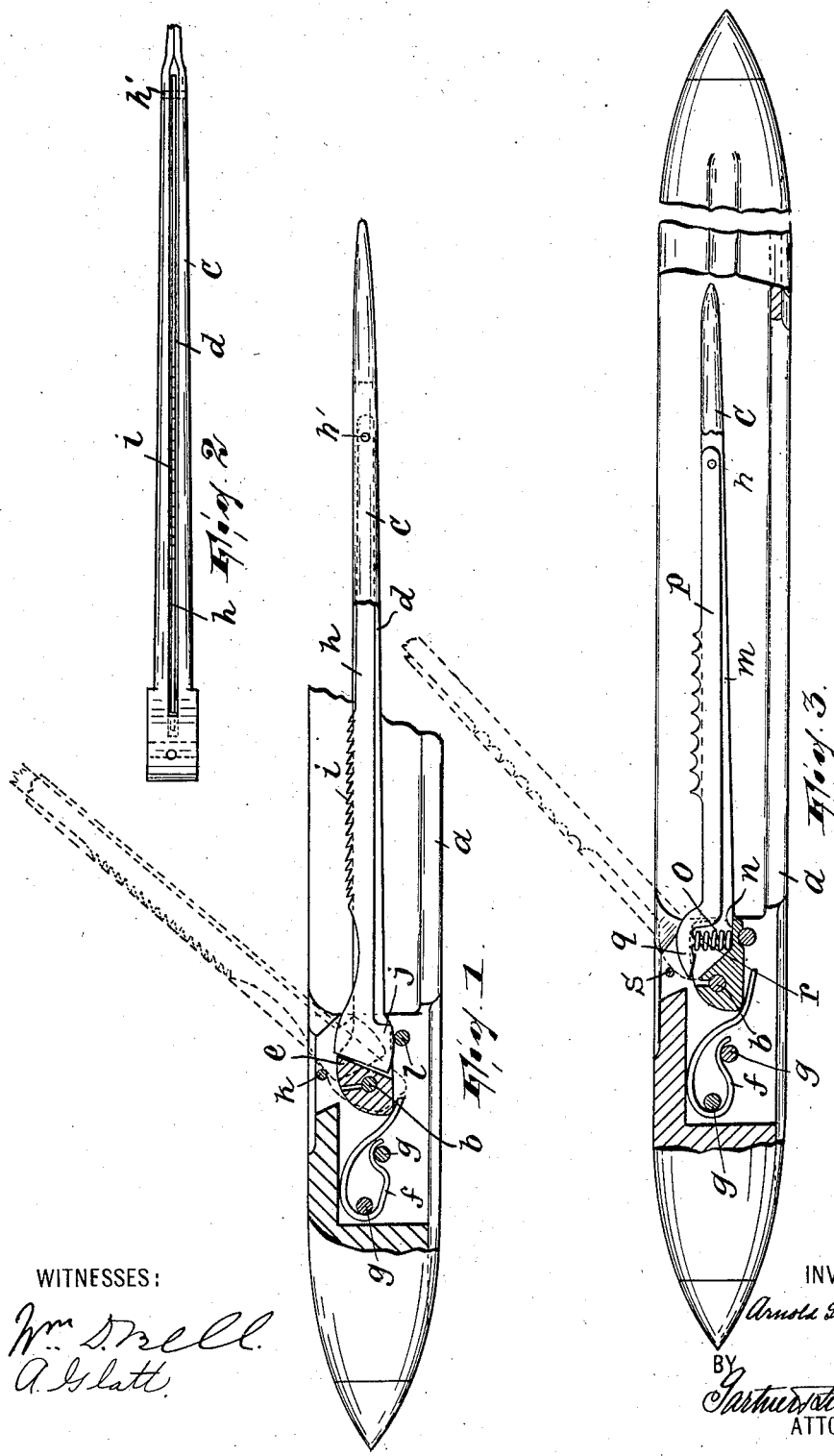
WITNESSES:
INVENTOR,
Arnold Guldemann,
BY
ATTORNEYS

UNITED STATES PATENT OFFICE.

ARNOLD GULDEMANN, OF PATERSON, NEW JERSEY, ASSIGNOR TO ISAAC A. HALL, OF PATERSON, NEW JERSEY.

LOOM-SHUTTLE.

No. 874,331.      Specification of Letters Patent.      Patented Dec. 17, 1907.

Application filed June 11, 1906. Serial No. 321,244.

*To all whom it may concern:*

Be it known that I, ARNOLD GULDEMANN, a citizen of the United States, residing in Paterson, Passaic county, New Jersey, have invented certain new and useful Improvements in Loom-Shuttles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this my present invention is to provide an improved means for preventing the cop or quill in a shuttle from slipping lengthwise on its spindle when the latter is in the depressed position, which means, however, shall be inactive when the spindle is in the raised position.

In view of the foregoing, my invention consists in providing a serrated or toothed strip arranged substantially longitudinally in the spindle and movable therein toward and from its axis, and means, operative on opposite sides of said strip, for causing the same to move in the spindle, according as the latter is in the raised or depressed position, whereby to sheath or unsheath its teeth or serrations or otherwise effect a disengagement or engagement between said teeth or serrations and the bore of the quill or cop.

My invention consists also in pivoting the strip in the spindle, providing means for causing the same to be raised when the spindle is depressed and to thus project its teeth or serrations, and providing additional means for limiting the upward movement of the strip in the spindle at this time.

The invention will be found fully illustrated in the accompanying drawings, wherein, Figure 1 is a fragmentary view of a shuttle showing one form of my improvement; Fig. 2 is a plan view of the spindle and strip of Fig. 1 removed from the shuttle; and, Fig. 3 shows a shuttle, partly in side elevation and partly in section, illustrating another form of my improvement.

Referring, first, to Figs. 1 and 2: in the shuttle body $a$ is pivoted, on a pin $b$ and in the usual manner, the spindle $c$. Said spindle is formed with a longitudinal slit $d$ so shaped at the butt—or pivot—end of the spindle as to produce an overhang or projection $e$. $f$ is the usual plate spring held under tension by the pins $g$ and so acting on the spindle as to hold it elevated or depressed. $h$ is a strip having its top edge toothed or serrated, as at $i$, and pivoted on a pin $h'$ near its outer end in the spindle in the slit $d$ thereof in such manner as to be movable toward and away from the longitudinal axis of the spindle; at its free end and on its lower edge is formed a lug $j$. Said strip fits rather snugly in the spindle so that it may not move therein on its pivot unintentionally. When the strip is elevated, i. e., in the full-line position shown in Fig. 1, its teeth or serrations project from the spindle and may thus engage the bore of a cop or quill whereby to hold the latter against slipping on the spindle; when the strip is depressed, its teeth or serrations disengage or clear the bore of the cop or quill, which may thereupon be removed without hindrance. The strip is depressed when the spindle is elevated, and, vice versa, it is elevated when the spindle is depressed, and this is accomplished in the present instance by providing two stops or pins $k$ and $l$ respectively mounted in the shuttle body $a$ above and below the spindle so that, when the spindle is raised, it will move the strip against the stop $k$, depressing the strip, and, when the spindle is depressed, the strip will be thereby engaged with the stop $l$ and caused to be elevated.

In the construction shown in Fig. 3, the shuttle body $a$, spring $f$, pivot pin $b$, pins $g$ and spindle $c$ are substantially the same as in Fig. 1; the slit $m$ in the spindle is in this instance shaped to form a seat $n$ for a small spiral spring $o$. $p$ is the serrated or toothed strip pivoted in said slit near its outer end and formed at its inner or free end with an extension $q$ which rests on said spring and has an integral downwardly extending pintle fitting into the spring to keep the parts in proper operative position. Above the said inner end of the strip is a stop or stop pin $s$ mounted in the shuttle in such position as to be only engaged by the extension $q$ when the same is raised; one function of this stop is to prevent the strip from becoming disengaged, as regards its pintle, from the spring $o$. In this instance, when the spindle is elevated the extension $q$ brings up against the stop $s$, which causes it to be depressed in the spindle so that its teeth or serrations will be disengaged from the cop or quill; when the spindle is depressed the spring at once raises the strip, causing the teeth or serrations to engage the cop or quill and so hold the same against slipping thereon.

In the construction shown in Figs. 1 and 2 the effectiveness of the spring $f$ must be relied on to insure the strip being adequately elevated; if said spring does not fully depress the spindle, the strip will not be fully elevated. In the construction shown in Fig. 3 the strip will be elevated, whenever not depressed by the stop $s$, without regard to spring $f$.

Having thus fully described my invention, what I claim and desire to secure by Letters Patent is:

1. In a shuttle, the combination of the body, a spindle pivoted therein, a strip arranged substantially longitudinally in the spindle, said strip being toothed or serrated along one edge and movable toward and away from the longitudinal axis of said spindle, means for causing said strip to move to depress its toothed or serrated edge when the spindle is elevated, and a spring normally tending to raise said strip in the spindle, substantially as described.

2. In a shuttle, the combination of the body, a spindle pivoted therein, a strip arranged substantially longitudinally in the spindle, said strip being toothed or serrated along one edge and movable toward and away from the longitudinal axis of said spindle, means for causing said strip to move to raise its toothed or serrated edge when the spindle is depressed, and means for limiting the upward movement of said strip in the spindle in any of the various positions of said spindle, substantially as described.

3. In a shuttle, the combination of the body, a spindle pivoted therein, said spindle having a longitudinal slit and a seat adjacent one end of said slit, a strip pivoted in said slit and being toothed or serrated along one edge thereof, a spring interposed between said strip and the seat and normally tending to raise the strip in the spindle, and means for causing said strip to move to depress its teeth or serrations, when the spindle is raised, substantially as described.

In testimony, that I claim the foregoing, I have hereunto set my hand this 11th day of May 1906.

ARNOLD GULDEMANN.

Witnesses:
JOHN W. STEWARD,
WM. D. BELL.